(12) United States Patent
Fink et al.

(10) Patent No.: US 10,785,443 B2
(45) Date of Patent: Sep. 22, 2020

(54) AUGMENTED REALITY VIDEO STREAM SYNCHRONIZATION ACROSS A NETWORK

(71) Applicant: STREEM, INC., Portland, OR (US)

(72) Inventors: Ryan R. Fink, Vancouver, WA (US); Sean M. Adkinson, North Plains, OR (US); Trey Trahin, Beaverton, OR (US)

(73) Assignee: STREEM, INC., Portland, OR (US)

( * ) Notice: Subject to any disclaimer, the term of this patent is extended or adjusted under 35 U.S.C. 154(b) by 18 days.

(21) Appl. No.: 16/222,596

(22) Filed: Dec. 17, 2018

(65) Prior Publication Data

US 2019/0191125 A1  Jun. 20, 2019

Related U.S. Application Data

(60) Provisional application No. 62/607,258, filed on Dec. 18, 2017.

(51) Int. Cl.
| | |
|---|---|
| *H04N 7/08* | (2006.01) |
| *G06T 11/00* | (2006.01) |
| *G06K 9/00* | (2006.01) |
| *G06T 7/70* | (2017.01) |
| *H04N 21/234* | (2011.01) |
| *H04L 29/06* | (2006.01) |
| *H04N 21/81* | (2011.01) |
| *H04N 21/8547* | (2011.01) |
| *H04N 21/488* | (2011.01) |
| *H04L 29/08* | (2006.01) |

(52) U.S. Cl.
CPC ............ *H04N 7/08* (2013.01); *G06K 9/00671* (2013.01); *G06K 9/00744* (2013.01); *G06K 9/00758* (2013.01); *G06T 7/70* (2017.01); *G06T 11/00* (2013.01); *H04L 65/403* (2013.01); *H04L 65/80* (2013.01); *H04L 67/38* (2013.01); *H04N 21/23418* (2013.01); *H04N 21/4882* (2013.01); *H04N 21/816* (2013.01); *H04N 21/8133* (2013.01); *H04N 21/8547* (2013.01); *G06T 2207/10016* (2013.01); *H04L 67/1095* (2013.01); *H04N 7/0806* (2013.01)

(58) Field of Classification Search
None
See application file for complete search history.

(56) References Cited

U.S. PATENT DOCUMENTS

| | | | |
|---|---|---|---|
| 2018/0040167 A1* | 2/2018 | Weisman | A63F 13/847 |
| 2018/0124370 A1* | 5/2018 | Bejot | G06T 11/00 |

\* cited by examiner

*Primary Examiner* — Edward Martello
(74) *Attorney, Agent, or Firm* — Schwabe, Williamson & Wyatt, P.C.

(57) ABSTRACT

A platform for synchronizing augmented reality (AR) views and information between two or more network connected devices is disclosed. A first device captures a video stream and associated spatial information, and transmits the video stream and spatial information to a second device. A user of the second device views the video stream, and inserts one or more AR objects into the video stream, with reference to the spatial information. The second device transmits the AR objects and spatial information references to the first device, which then renders the one or more AR objects into the video stream, using the spatial information references to locate the AR objects in each video stream frame.

20 Claims, 7 Drawing Sheets

NON-TRANSITORY COMPUTER-READABLE STORAGE MEDIUM
602

PROGRAMMING INSTRUCTIONS 604
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 6

AUGMENTED REALITY VIDEO STREAM SYNCHRONIZATION ACROSS A NETWORK

RELATED APPLICATIONS

The present disclosure claims priority to U.S. Provisional Application Ser. No. 62/607,258, filed 18 Dec. 2017, the contents of which are hereby incorporated by reference as if fully set forth herein.

TECHNICAL FIELD

The present disclosure relates to the field of augmented reality (AR), and specifically to methods and systems for synchronizing an augmented reality video stream across a network.

BACKGROUND

Various devices today, such as smartphones, tablets and smart glasses, are capable of supporting augmented reality (AR). Broadly, AR includes the superimposition of virtual and computer-generated objects over a video stream of a user's surroundings. For example, a person may initiate a video stream of their surroundings on a smartphone, and then use software to add objects to the video stream, making it appear as if the virtual objects were placed within the real world. In various AR implementations, the video stream or feed from a camera, typically the device's on-board camera, may be processed using various algorithms to detect features in the video, such as planes, surfaces, faces, and other recognizable shapes. These detected features may then be used as anchor or reference points for the placement of virtual objects, so that the objects appear stationary with respect to other objects in the scene as the user moves the camera around.

To enhance the AR experience, feature detection may be augmented with motion information captured from motion sensors, such as a MEMS gyroscope and accelerometers, which can instruct AR software as to how the camera is moving, e.g. tilt, pan, rise, fall. This motion information may be combined with detected features and anchor points to provide a more accurate understanding of where the camera is moving in relation to the captured scene, and thus allow virtual objects placed in the video stream to more realistically appear and interact with real objects in the video stream.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 6 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
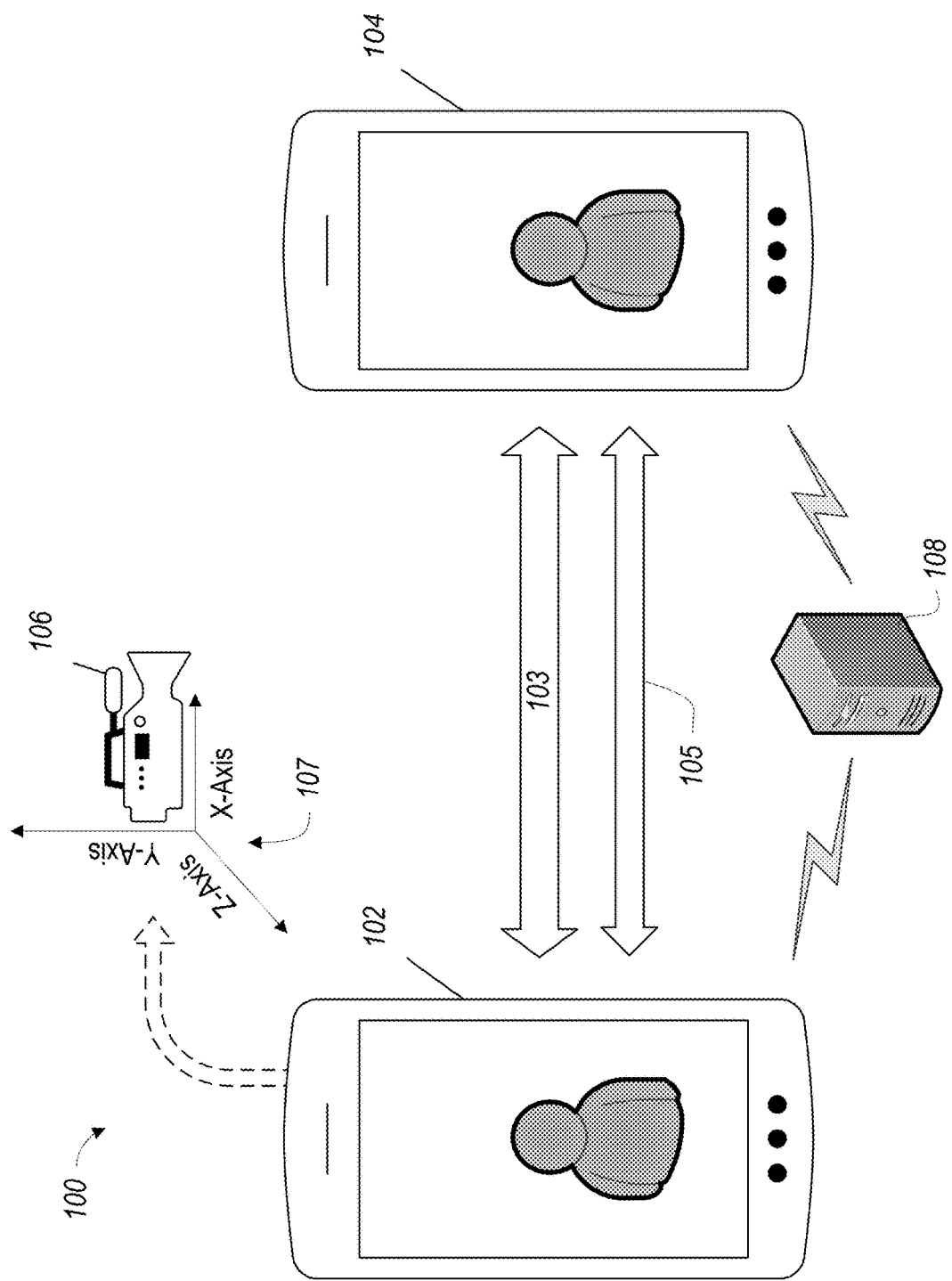
FIG. 1 illustrates a block diagram of the system components of a system implementing AR video stream synchronization across a network, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

AR applications are typically single-device experiences. Sharing an AR experience with a remote device and/or allowing a remote device to superimpose AR objects on a video stream received from a different device poses a challenge, as the lack of spatial information, including motion information and/or depth information, to the remote device may limit the AR software to locally available analysis, such as shape recognition. Thus, the remote device may be enabled to more accurately superimpose AR objects on a video stream from a different device if it can be provided with spatial information that may only be measured by the device capturing the video stream. Further, where the remote device superimposes AR objects, accurately reflecting those objects back to the device originating the video stream requires synchronization of motion and/or detected spatial information. The disclosed embodiments provide a solution to allow an AR experience to be shared and synchronized between devices across a network in real time.

FIG. 1 illustrates an example system 100 that, in embodiments, provides for synchronization of an augmented reality video stream across a network. System 100 includes a consumer device 102 and a service provider device 104, which in turn may be linked via network connections 103 and 105. Consumer device 102 further may include a camera 106 and a spatial position sensor 107. In the depicted embodiment of FIG. 1, consumer device 102 and service provider device 104 are both smartphones, which may be implemented as a computer device 500. Other embodiments may implement either of devices 102 or 104 on a variety of different devices, such as a computer (desktop or laptop), tablet, two-in-one, hybrid, smart glasses, or any other computing device that can accept a camera and provide necessary positional information, as will be discussed in greater detail herein.

Network connections 103 and 105 may be carried by any suitable network technology that allows consumer device 102 and service provider device 104 to exchange video and spatial data. Such network connection may be over a local or wide area network, including the Internet. Network connection 103 may carry a video stream generated by consumer device 102, and network connection 105 may carry spatial data associated with the video stream from consumer device 102. From the service provider device 104, data indicating an overlaid AR object may be sent to consumer device 102, and may be carried over either network connection 103 or 105, or possibly a third network connection.

The separation of network connections 103 and 105 may be logical in nature, with both connections being carried over a single physical connection, such as a WiFi, Ethernet, cellular connection, or another suitable network technology. In some embodiments, the logical connection is defined as a separate data payload, so that the video stream and its associated data define network connection 103, and spatial data defines network connection 105. In other embodiments, both the video stream and spatial data may be combined or interleaved into a single logical channel. Network connections 103 and 105, in other embodiments, may be distinguished by different logical ports, such as where the connections employ the transmission control protocol (TCP).

Consumer device 102 and service provider device 104 may be in communication with a central server 108. Central server 108 may act as a communications intermediary, handling set up of the initial connection(s) between consumer device 102 and service provider device 104. In some embodiments, network connections 103 and/or 105 are coordinated by and/or pass through central server 108, which may moderate the connections, perform any necessary data processing and/or transformations of connection data, and may store data transferred between consumer device 102 and service provider device 104 for later reference. In other embodiments, central server 108 may coordinate initial setting up of network connections 103 and/or 105, after which consumer device 102 and service provider device 104 continue to communicate directly over network connections 103 and/or 105. Central server 108 may be operated by a third party, and may be accessible over the Internet, with network connections 103 and/or 105 comprising logical connections or channels that are transported over the Internet. In some embodiments, central server 108 is a cloud service offered by the third party. Central server 108 may be implemented as a stand-alone server, with either a single or multiple physical machines, as or in a data center, via one or more virtual machines or servers, or using any other suitable technique or configuration to provide a network service that is now known or later developed.

Camera 106, in embodiments, is any camera that can provide a suitable video stream for the intended purpose of consumer device 102. Where consumer device 102 is implemented as a smartphone or tablet, camera 106 may be a built-in camera. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 106 may be configured to output standard or high-definition video, 4K video, or another resolution of video suitable for the intended purpose of camera 106 and consumer device 102.

In the disclosed embodiments, spatial position sensor 107 is configured to provide positional information about camera 106, such as camera 106's pan and tilt. Other measured positional vectors may include camera movements, such as the camera rising or falling, or moving laterally. Spatial position sensor 107 may be implemented with micro or MEMS sensors, such as gyroscopes to measure angular movements and accelerometers to measure linear movements such as rises, falls, and lateral movements. In other embodiments, spatial position sensor 107 may be implemented using any suitable technology capable of measuring spatial movements of camera 106.

In embodiments, spatial position sensor 107 is physically affixed at a suitable location to camera 106, and in such a manner that any movements in space of camera 106 are detected by spatial position sensor 107. In other embodiments, spatial position sensor 107 is combined with camera 106 into consumer device 102, such as where consumer device 102 is a smartphone, tablet, or similar device. It will be understood that, depending upon the distance of the position of position sensor 107 from the center of camera 106's field of view, some amount of transformation of position data from position sensor 107 may be necessary to ensure the position data sufficiently and accurately reflects changes to camera 106's field of view. Spatial position sensor 107, in embodiments, provides spatial data to an AR processing layer in consumer device 102, which correlates the spatial data with the video stream captured by camera 106.

Figure 2:
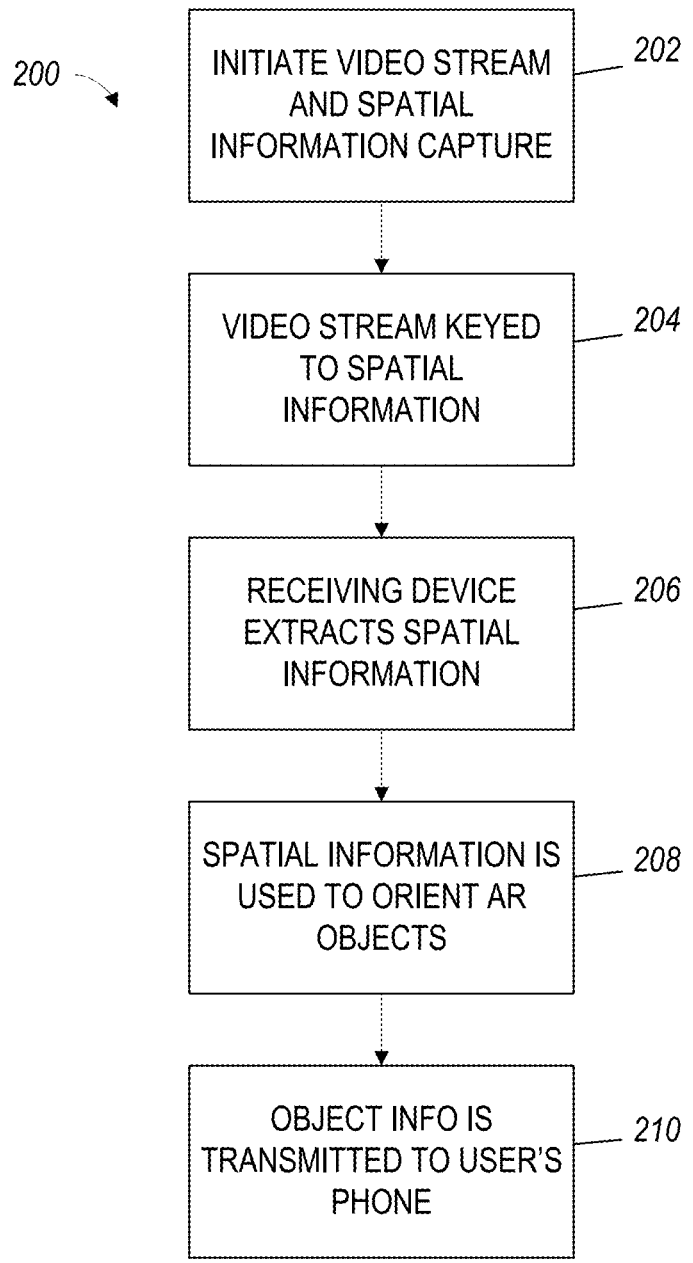
FIG. 2 is a flowchart of a method for AR video stream synchronization across a network that may be implemented by the system of FIG. 1, according to various embodiments.

Turning to FIG. 2, an example method 200 for synchronizing AR data across a network is detailed. In various embodiments method 200 may be performed, in whole or in part, by one or more components of system 100, including consumer device 102 and service provider device 104. In block 202, a video stream, e.g. such as from a camera 106, is initiated, and a stream of corresponding spatial information is initiated, such as from spatial position sensor 107. The video stream may, in examples, be initiated from consumer device 102 and directed to service provider device 104. The video stream may have specifications that vary depending upon the nature and type of device used for capture, such as varying models of consumer device 102 and/or camera 106. Some video streams may be captured in standard definition ("SD", generally around 480 scan lines, e.g. 480p, with a 2D resolution of approximately 720×480), high definition ("HD", 720p or 1080p, corresponding to resolutions of 1280×720 and 1920×1080, respectively), or higher definitions such as 4K or Ultra HD (also known as Quad HD, QHD, or 2160p, corresponding to a resolution of 3840×2160). Further developments may provide enhanced video resolutions, such as 8K, or even 3D captures in the future.

In some embodiments, the video stream may be initiated by contact with central server 108, such as by consumer device 102. Central server 108 may then allow selection of a service provider, via consumer device 102. Following selection, central server 108 may then initiate a communications session between consumer device 102 and a service provider device 104 that is associated with the selected service provider. Central server 108 may hand off the communications session, so that consumer device 102 is in direct network communication with service provider device 104, in one possible example, or may act as an intermediary or relay for communications between consumer device 102 and service provider device 104, in another example. In embodiments where central server 108 acts as an intermediary, central server 108 may be configured to perform any necessary data translation or conversion between consumer device 102 and service provider device 104, such as where the two devices are mutually incompatible and cannot otherwise be configured to communicate. Still further, where central server 108 acts as an intermediary, central server 108 may enable more than two devices to share a communications session, e.g. one consumer device 102 may provide a video stream and spatial data to multiple service provider devices 104, with central server 108 acting to copy and relay the data between all devices.

The nature of the actual captured video stream may also depend upon the type of network used to connect device 102 with device 104. For example, where devices 102 and 104 are interconnected over a local WiFi hotspot and so share the same network, a high resolution and correspondingly high bandwidth video stream, such as 1080p or 4K, may be employed, as WiFi may offer sufficient bandwidth to handle a 4K stream. Conversely, where devices 102 and 104 are interconnected over a cellular network with only moderate bandwidth, with each device being substantially remote from the other, a lower bandwidth video stream (e.g. standard definition or 720p) may be employed. In any case, the available transmission bandwidth may be used to determine an appropriate video stream resolution so that each device can provide a relatively smooth video and AR experience. Moreover, dynamic adjustment of resolution may be utilized, where the video stream resolution is adjusted periodically or on the fly in response to changing network conditions. Thus, as a network becomes more congested, devices 102 and 104 may negotiate a lower resolution to ensure that an acceptable frame rate and AR experience are provided; conversely, as network bandwidth becomes more available, devices 102 and 104 may negotiate a higher resolution to maximize the visual experience. As a general principle, bandwidth that is sufficient to handle a video stream will be more than adequate to handle AR and position information, as such information tends to require significantly less data.

Each video stream may be comprised of a progressive series of video frames, typically captured at a rate of approximately 30 frames per second (FPS). Other implementations may vary the frame rate. In some implementations, higher frame rates of 60, 90, or greater may be employed. As with video resolution, some embodiments may employ dynamic frame rates, where the rate is changed to arbitrary amounts based upon network conditions, with lower available bandwidth resulting in lower frame rates, and greater available bandwidth resulting in higher frame rates.

In block 204, captured spatial information from the spatial information stream is tied to a corresponding video frame so that the motion of the camera of device 102 can be correlated to the camera's particular view for a given frame. In some embodiments, the spatial information stream is captured at a periodic sampling rate that may differ from the video stream frame rate. Each video frame, then, may be tied to spatial information captured from the spatial information stream during the time duration of the video frame. For example, with a frame rate of 30 FPS, each frame lasts $\frac{1}{30}^{th}$ of a second, and so spatial information captured during the corresponding $\frac{1}{30}^{th}$ of a second of the initial frame capture are tied, keyed, embedded, or otherwise associated with the video frame. In some embodiments, each video frame may be tagged with the spatial information as metadata. In other embodiments, the spatial information may be stored separately from each video frame, either in a separate data structure or file, with each video frame and/or corresponding spatial information indexed so that the video stream can be subsequently correlated with the correct spatial information. In embodiments where consumer device 102 is capturing the video, this correlation may be handled by an internal software stack for device 102, such as Apple's ARKit, available in versions of the iOS software. This software may be responsible for keeping video frames synchronized with their corresponding spatial information.

In some embodiments, spatial information also includes information derived from the AR layer of the consumer device 102, such as Apple's ARKit. This information may include a point cloud of depth data identified by the AR layer as well as one or more anchor points (which may be part of the point cloud), comprising identified fixed (relative to the camera) points that the AR layer tracks through successive video frames. Examples of anchor points may include identifiable features in a scene such as a doorknob, edge or point of a table, distinct furniture features, objects on a surface, or any other physical object in the video stream that the AR layer can associate with a depth relative to the camera position and that can be tracked across frames as the camera 106 is moved. Some AR implementations can remember the location of anchor points relative to other feature points or depth points in the point cloud even when moved off-frame, allowing an AR object placed relative to the anchor point to move off screen if the camera is panned away, and reappear when the camera is panned back and the anchor point is reacquired. These anchor points and/or point cloud may be transmitted as part of the spatial information.

When transmitting the video stream, depending upon the specifics of a given implementation, a buffer may be employed at various stages in the transmission chain to accommodate the possibility of transient delays or required retransmissions due to transient channel interference. In embodiments where spatial information is transmitted in a different logical channel 105, viz. a separate data stream, as discussed above with reference to FIG. 1, it is possible that frames from the video stream may arrive at a different time from spatial information. For example, spatial information, potentially having a substantially smaller payload compared to the video stream and so requiring less time and bandwidth, may easily be transmitted reliably. Its corresponding video frame, potentially having a relatively greater payload and so requiring greater time and bandwidth for transmission, is potentially more susceptible to delays due to transient channel interference, and may arrive delayed from the spatial information. As will be understood, such a delay may not be an issue or may not be present where the spatial information is embedded or otherwise transmitted as part of the video stream.

For transmission over the network to device 104, and particularly in some embodiments where spatial information is transmitted in a separate stream from video, each frame of the video stream may be tagged with a key to correlate to a particular portion of the spatial information stream that corresponds to the camera's movement at the time of frame capture. The spatial information may likewise be tagged with the same key as its corresponding video frame. This tagged enables each frame of the video stream to be reassociated, such as by service provider device 104, with its corresponding spatial information in the event that the video stream and spatial information arrive at different times (e.g. out of sync). In some embodiments, this key may comprise a rolling frame number that may index into the spatial information stream, e.g. once the number reaches its limit, it rolls around to zero and restarts its count.

The size of the key (e.g. available numbers) may impact upon the amount of video that can be buffered and the degree to which the video stream and spatial information can be transmitted out of sync. In one particular embodiment, the tagged key may comprise an 8-bit number (ranging from 0-255). Each frame may be numbered sequentially starting at 0 and counting to 255, at which point the next frame restarts at number 0. Where video is transmitted at a rate of 30 frames per second (fps), an eight-bit key allows for approximately eight (8) seconds of video frames, which corresponds to roughly 240 frames, to be transmitted out of sync before frames and/or spatial information must be skipped or dropped, resulting in an interrupt or hiccup in AR synchronization and/or the video stream.

It will be appreciated that the size/range of the key may be varied depending upon the condition of the network, video frame size (e.g. SD, HD, UHD), video frame rate (24 fps, 30 fps, 60 fps, etc.), and available buffer size. For example, higher frame rates transmitted over a given network speed and bandwidth may necessitate a larger buffer. For a given video resolution, a 60 fps video stream will only allow for four (4) seconds of un-synced video frames with an 8-bit key compared to the same video resolution at 30 fps. A 16-bit key, by comparison, would allow for over 64,000 unique keys, which amounts to over half an hour (>36 minutes) of video frames at 30 fps, and over 18 minutes at 60 fps (>18 minutes). However, available buffer space and/or storage subsystem bandwidth (such as in implementations where buffer space requires writing to storage) may impose a shorter limit, despite sufficient key space. A key that is shorter than 8 bits will allow fewer frames to be buffered, as will be understood. The key sizes described above are merely examples; any suitable key length may be employed, depending upon the needs of a given implementation, and may be selected in consideration of other aspects discussed above, e.g. video resolution, available network and/or storage subsystem bandwidth, available buffer resources, etc.

Other embodiments may not use a numerical key, but instead could use some generated code or tag that is unique to each frame, such as a hash generated from each frame, possibly by using a hash function such as MD5. Where a function is used to generate a unique non-repeating key for each frame, synchronization may be possible over extended periods of delays, to the point where other factors become limiting, such as buffer size limits or the ability to easily resync AR objects created on device 104 to device 102, and practical limits, such as user patience with a substantially delayed stream.

Following tagging, the video stream and spatial information stream may be transmitted over network connections 103 and 105, respectively, to device 104. In block 206, a receiving device, such as service provider device 104, may extract the spatial information. The spatial information is then reassociated with its corresponding frame, such as, in various embodiments, by using the tagged key discussed above, thus effectively reconstructing the information supplied by the transmitting device; for example, the information that the hardware or software (such as ARKit) on device 102 would supply.

Once the video and spatial information are reassociated, in block 208 the receiving device, such as device 104, may use the spatial information, possibly in conjunction with image analysis of each frame to identify reference objects, as discussed above, to render and place virtual objects within the video stream. The captured spatial information may allow software on the receiving device, such as Apple's SceneKit or another suitable graphics API, to position a virtual camera and render an object accurately within the video stream. In some embodiments, the receiving device may perform image analysis on the received frame to determine reference objects, which may be combined with transmitted spatial information. In other embodiments, the transmitting device, such as device 102, may perform the image analysis and transmit information identifying the reference objects along with other spatial information to the receiving device.

Finally, in block 210, the rendered object and other AR information may be transmitted, such as from device 104 back to device 102, where the receiving device can use the rendered object information along with its video and spatial information to recreate the AR scene as generated by the initial receiver of the video stream, e.g. service provider device 104. A user the initial transmitting device, e.g. consumer device 102, may thereby be enabled to share a view of their surroundings with a user of the receiving device, e.g. service provider device 104, who can then superimpose objects and share the superimposed objects with the user of the initial transmitting device.

Similar to the initially transmitted video and/or spatial information, the AR information may be transmitted from device 104 over one or more of the network channels 103 or 105, or possibly over a third network channel, depending upon the needs of a given implementation. The transmitted AR information may comprise quantity, location, size, and shape of various placed AR objects, and/or any other information specific to a given AR implementation. For example, devices that implement ARKit and/or SceneKit for graphics rendering may define or otherwise require specific types and/or structures of data to define and position an AR object; other available interfaces may specify different data types and/or structures. This information may be tagged with the same key number used to tag the video frame and spatial information transmitted from device 102 to 104, which then may be used by device 102 to correlate the AR information with its associated frame and spatial information for local rendering of the AR objects.

Some embodiments may employ a pre-processing stage on the initial transmitting device, e.g. consumer device 102, that performs synchronization of the received AR information with the video stream, along with any other necessary processing, prior to providing the AR information to the AR and graphics rendering subsystems. Such a pre-processing layer can, in some implementations, enable cross-platform communications, e.g. where consumer device 102 runs Apple iOS, and the service provider device 104 runs Google Android. In such an embodiment, Android may use a different data form for AR objects that would need to be translated for Apple's ARKit. Other embodiments may employ an abstraction layer on both consumer device 102 and on service provider device 104, where data is transmitted in a relatively generic or industry-standard format, and the abstraction layer handles any necessary translation to each respective device's particular AR and graphics interfaces. In still other embodiments, a central server 108 may handle any necessary translation, with each respective device connecting to central server 108 identifying its type (iOS, Android, Windows) and/or specific interface requirements.

Figure 3A:
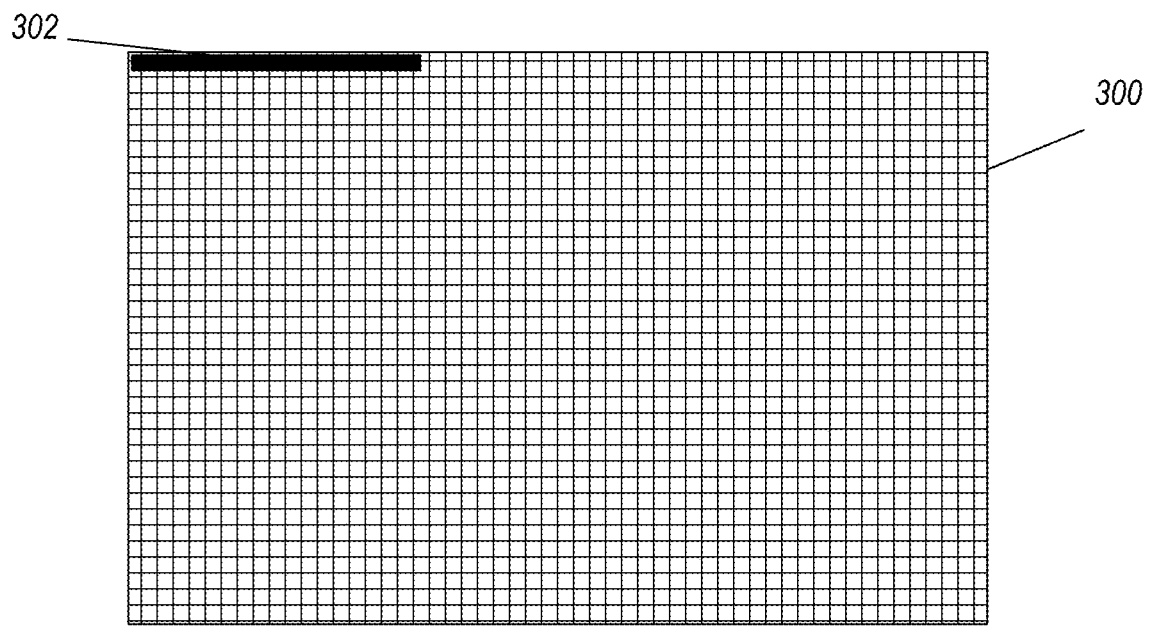
FIGS. 3A and 3B depict possible video frame layouts for including synchronization data, according to various embodiments.
Figure 3B:
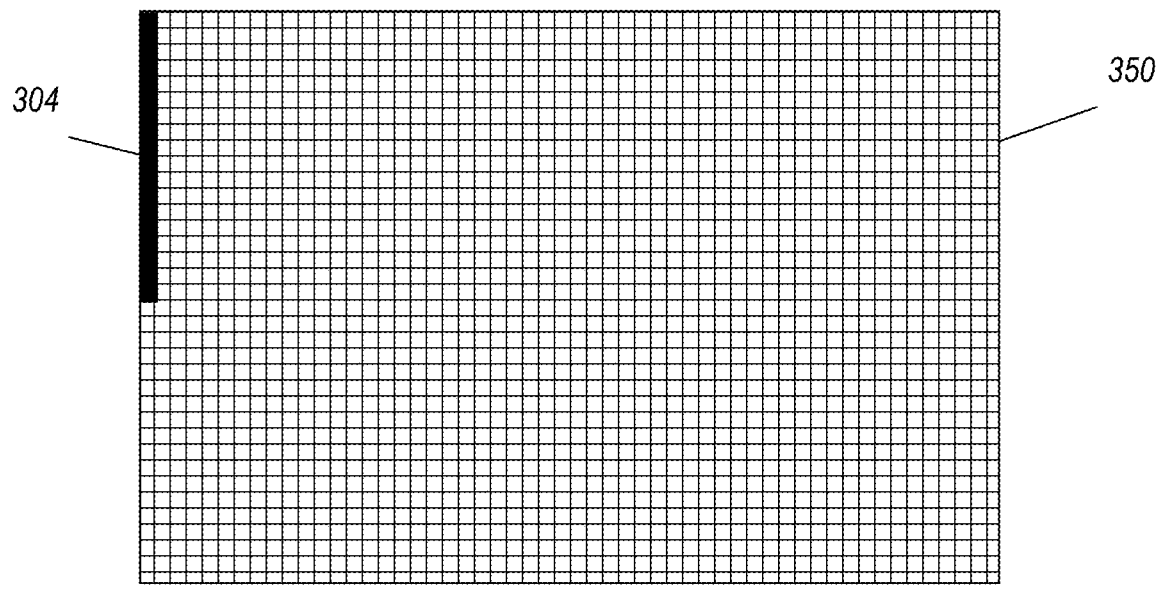

FIGS. 3A and 3B depict two different arrangements by which a key may be tagged to a video frame for transmission and correlating associated spatial information, as discussed above. FIG. 3A depicts a video frame 300, which is shown as a grid to indicate the various video pixels in its 2-D arrangement, as may be seen on a screen. Key 302 is shown in the upper left corner, indicating that it may be tagged to the first series of pixels at the start of the frame that comprise a horizontal row. Similarly, FIG. 3B depicts a video frame 350, with key 304 shown tagged to the first series of pixels in the left-most vertical column.

The figures are not to scale, as each pixel itself may comprise 24 or 32 bits (8 bits each for red, green, blue, and possibly an alpha channel). Where the key 304 is 8 bits, it may be transmitted over a single channel in one pixel, such as the first pixel transmitted for a given frame. Placement of the tag within an edge row or column may allow the pixel or pixels (or more accurately, one or more channels within a pixel) to effectively be hidden on most screens due to overscan, or to otherwise be ignored as a screen edge artifact, or, for displays with relative high pixel pitches (e.g. greater than 200 pixels per inch, such as on Apple's Retina® display), to effectively be unnoticeable. Such placement may also simply limit the tag to pixels right at the border where the effect of the tag on the pixel's values and corresponding appearance when rendered will not feasibly be noticed.

Alternate embodiments may include repeating the tag across several pixels for redundancy, embedding the tag across a complete row or column, and/or repeating the tag for random pixels throughout each frame. Still other embodiments may use an alpha channel or other format for embedding. The alpha channel in video may be used to determine transparency of a given pixel, where embedding the tag in the alpha channel of a pixel may not result in any visible alteration to the image, depending upon the nature of the application using the video frame. In a possible embodiment, for example as may be employed on Apple's iOS, an NV12 color format may be employed, which is a variant of a Y-U-V format. The Y channel may carry luminance information, which may be used to carry the tag. Still other embodiments may use algorithms similar to digital watermarking, as is known in the prior art, to effectively embed the tag in each video frame in an invisible fashion.

It should be observed that some video formats employ various compression schemes to reduce the bandwidth requirements for a given video resolution and frame rate. Some compression schemes that may be employed are lossy in nature, such as MPEG or AVC-HD encoding, which may, in some embodiments, only occasionally transmit complete frames. Intermediate frames are reduced to information about changes between frames, leaving the video decompressor and decoder responsible for video playback to recreate each actual frame. Many such schemes employ techniques to ensure that only redundant information is discarded, and so the tag may be unaffected. Nevertheless, placement of the tag may require consideration of the compression scheme to be used to ensure it is passed through accurately, and not discarded in the compression process. For example, use of an entire row or column to embed the tag information may ensure that the tag is not discarded by a lossy compression scheme. Where the employed compression poses a risk of tag corruption or loss, some embodiments may delay tagging each video frame until following compression, insert the tag into the compressed video stream, and then extract the tag prior to decompression. Other embodiments may employ redundancy, embedding the tag in multiple locations prior to compression to ensure that the tag survives compression; such an approach has the added benefit of helping ensure tag transmission in the presence of possible channel interference or corruption. Another embodiment may also represent a single bit as a full byte, using 0 or 255 to indicate 0 or 1, so that slight changes in pixel colors do not change the value of the embedded key.

Although the tag or key has been described in the foregoing discussion as useful for correlating spatial information with each video frame, the tag or key is also useful for uniquely identifying each frame, which may be subsequently used for syncing any AR objects placed by a user of service provider device 104 with the video stream from consumer device 102. This relationship will be described in greater detail with reference to FIGS. 4A and 4B. Thus, in embodiments where spatial information is embedded into its corresponding frame(s), obviating the need to use a key for correlation with separate information, each frame nevertheless may be tagged with a key for purposes of placing an AR object into the video stream, if the particular AR implementation so requires.

While a key is one possible technique to correlate video frames to external data, any other mechanism or technique that allows each frame in the video stream to be relatively uniquely associated with external data may be employed, depending upon the needs of a given embodiment. Further, where relatively smaller keys are employed, e.g. 8 bits, it will be understood that such a key will roll over once it reaches 255. Depending on the specifics of a given embodiment, this may not pose an issue, as the previous frames with identical key numbers will likely have already been correlated with spatial information and/or AR objects, and displayed, and so the key number can be safely reused. A key with a larger numeric space (e.g. greater than 8 bits) may be employed in embodiments where there is a risk of buffering a greater number of frames than a relatively smaller key (e.g. equal or less than 8 bits) may provide, and it is critical that all buffered frames be uniquely tagged.

Figure 4A:
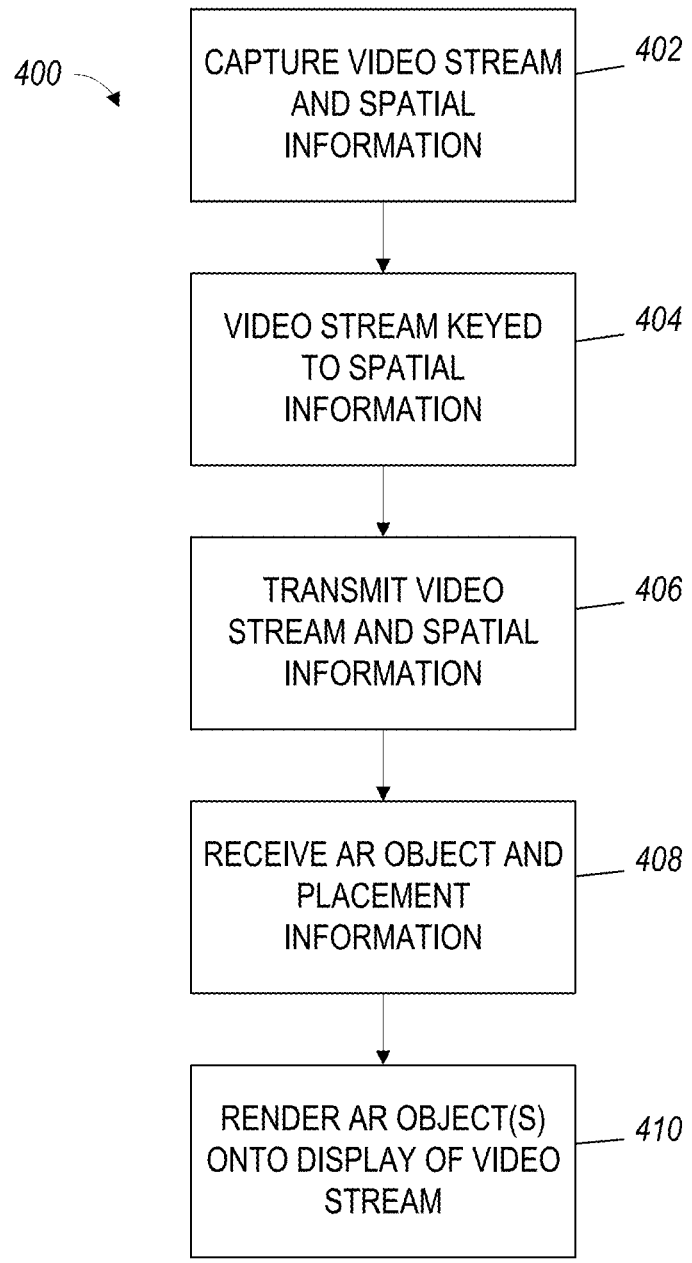
FIGS. 4A and 4B are flowcharts of methods for AR video stream synchronization that can be executed by a consumer device and a service professional device, respectively, according to various embodiments.
Figure 4B:
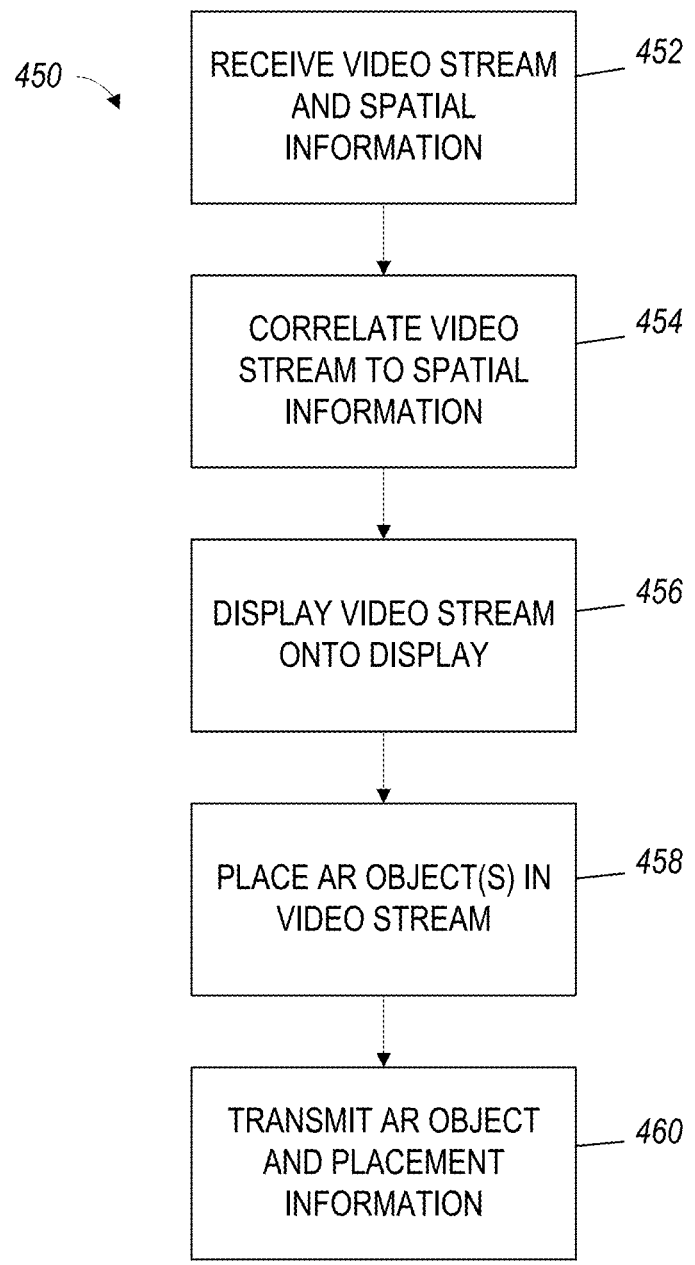

FIGS. 4A and 4B are flowcharts of two example methods 400 and 450 for handling placement of AR objects across a network. Methods 400 and 450 may be performed, in whole or in part, by consumer device 102 and service provider device 104, respectively. Various operations in each example method are duplicative of or similar to the operations described above with respect to method 200. The reader is directed to the foregoing discussion of method 200 for greater detail. As used in the following discussion of FIGS. 4A and 4B, "transmitting device" refers to the device that is transmitting the video stream and associated spatial position information. In embodiments, this is typically the consumer device 102. Likewise, "receiving device" refers to the device that is receiving the video stream and associated spatial position information, is placing AR objects, and transmitting those AR objects back to the transmitting device. In embodiments, this is typically the service provider device 104.

In operation 402 of method 400, a video stream and associated spatial information are captured, such as by a consumer device 102. In some embodiments, this capture from a video camera 106 and spatial position sensor 107 may be coordinated by an AR layer in consumer device 102, which is responsible for generating and/or coordinating any necessary AR data to support placement of AR objects, such as extracting or extrapolating depth data, generating a point cloud, designating anchor points, etc. In some implementations where the capturing device lacks a spatial position sensor, an AR layer may extrapolate camera movements and depth data by analysis of the video stream, such as by using photogrammetry techniques.

In operation 404, the various frames of the video stream are keyed to the spatial information, such as may be captured by spatial position sensor 107. As described above, operation 404 may be effected in different ways depending upon the needs of a particular embodiment. As will be described below, operation 404 may be unnecessary where spatial information is incorporated into the video stream in such a manner that correlation is inherent, e.g. the spatial data is embedded into each corresponding frame.

In operation 406, the video stream and spatial information are transmitted to a receiving device, such as service provider device 104. In some embodiments, the video stream is keyed to the spatial information, and each is then transmitted using a separate logical (if not physical) channel. In other embodiments where the video stream and spatial information are transmitted in a single channel, the spatial information may be combined with the video stream in any suitable fashion. For example, spatial information may be interleaved, overlaid, embedded, or otherwise incorporated into the video stream data. Techniques similar to those described above for embedded the key into each video frame may be used, where the spatial information itself is embedded into each frame, rather than a key. In some such embodiments, a key is unnecessary, as each video frame carries its own related spatial information, eliminating the requirement to later correlate spatial information to the video stream. In other embodiments, spatial information may be able to be interleaved between frame data, if bandwidth permits. A key may or may not be required in such configurations, depending on how the spatial information is incorporated into the video stream. As will be understood, the video stream and spatial information may be transmitted directly to a receiving device or, in other embodiments, may be transmitted to a central server 108, for subsequent retransmission to one or more receiving devices. Central server 108 may also perform and manipulations or transformations on the video stream and spatial information that may be necessary.

Following transmission of the video stream and spatial information, in operation 408, one or more AR objects and associated placement information (AR data) may be received by the transmitting device, e.g. consumer device 102, from the receiving device, e.g. service provider device 104, either directly or by way of a central server 108. In embodiments, the AR data may include a description of the particular AR object or objects, as well as data indicating where, in space and/or each video frame, the AR object or objects are to be located when rendered. In other embodiments, the AR data may be limited to a reference to an AR object or objects, in addition to location data. In such embodiments, both the transmitting and receiving devices, e.g. consumer device 102 and service provider device 104, may include a common library of AR objects that defines the characteristics of each object. The AR data would only need to reference a particular object in the library, which the transmitting and receiving devices could then retrieve for placement and rendering. In still other embodiments, such as where a central server 108 acts as an intermediary between the transmitting and receiving devices, central server 108 may provide AR object information that the transmitting and receiving devices can commonly reference.

Once the transmitting device, e.g. consumer device 102, receives the AR data from the receiving device, e.g. service provider device 104, the transmitting device may then render the AR objects received from the receiving device into the video stream that was previously transmitted, in operation 410. The transmitting device may then, in some embodiments, display the video stream and AR objects on a display attached to the transmitting device. Thus, a user of the transmitting device can view the scene captured by the transmitting device's camera and remotely placed AR objects from the receiving device in real-time.

In some embodiments, the AR data may simply be a reference or AR object description coupled with information that ties the AR object to one or more anchor points identified in the video stream. The anchor points are transmitted from the transmitting device to the receiving device as part of the spatial information. Thus, an object may be placed by a user with the receiving device, e.g. service provider device 104, received by the transmitting device, e.g. consumer device 102, and be persistently present in the video stream as viewed by a user of the transmitting device, based on anchor points identified by the AR subsystem (e.g. ARKit), as though the AR object were physically present in the scene captured by the transmitting device. In some such embodiments, the AR subsystem may handle managing anchor points, and likewise coordinate where the AR object(s) should be rendered in each video frame, as the transmitting device moves. In other embodiments, software specific to apparatus 100, such as client software for interfacing with a central server 108, handles coordinating received AR objects with anchor points in the video stream.

In some embodiments, as a precursor to rendering, the transmitting device may first need to correlate the AR data stream from the receiving device to the video stream. For example, where a user of receiving device, e.g. service provide device 104, is manipulating an AR object, such as a laser dot or pointer, the AR object may be moving across or around the video stream. Such movement will require not only tracking anchor points in the video stream, but also how the relationship of the AR object to the anchor points changes from frame to frame. In embodiments and as described above, the AR data can be tagged with successive keys that correlate to keys tagged to each video frame, allowing the movement of an AR object imparted by a user of the receiving device to be duplicated on the transmitting device. This correlated AR data can be provided to the transmitting device's AR layer, which may coordinate rendering of the object as it moves both relative to identified anchor points, as well as based on spatial position information for movements of the camera associated with the transmitting device.

In FIG. 4B, the operations of an example method 450 are depicted, which may be carried out by a receiving device in whole or in part. In some embodiments, method 450 may be carried out by service provider device 104. In operation 452, the receiving device receives the video stream and spatial information from the transmitting device, e.g. consumer device 102, and in operations 454, the receiving device correlates the video stream to the spatial information, as described above with respect to example method 200. As further described above, the spatial information may also include AR information, such as a point cloud and one or more anchor points, which may be part of the point cloud.

In operation 456, the video stream is displayed upon a display associated with the receiving device, allowing a user of the receiving device to view the video stream provided by the transmitting device, e.g. consumer device 102. The spatial information, along with the video stream, enables the user to interact with the video stream for placement of AR objects as if the receiving device were capturing the video. In some embodiments, an AR layer (such as ARKit) on the receiving device can use the spatial information in conjunction with the video stream to recreate the point cloud and/or anchor points that would be generated on the transmitting device. In other embodiments, and as discussed above, the spatial information includes some or all of the point cloud and/or anchor points generated by the AR layer on the transmitting device; such an approach may be beneficial when it cannot be guaranteed that the AR layer on the receiving device will determine identical or substantially identical anchor points and/or a depth point cloud as the AR layer on the transmitting device.

In operation 458, the user of the receiving device can interact with the displayed video by selecting one or more AR objects to place within the scene. The AR layer of the receiving device can rely upon received spatial information (including a point cloud/anchor points, if transmitted) to place the AR objects similar to how they would be positioned and viewed if placed by a user of the transmitting device. As will be understood by someone skilled in the relevant art, the AR objects may be tied to one or more identified anchor points, to allow the AR objects to appear fixed in the frame, similar to other physical objects, as discussed above. Further, depending upon the specific embodiment, the user may select the AR objects from a library of possible objects or may create their own objects. The placement of AR objects may be dynamic, such as a user of the receiving device interacting with a dot or laser point, which the user may move around the scene, even as the user of the transmitting device may be moving the transmitting device.

In operation 460, information about the AR object and its placement is transmitted from the receiving device, e.g. service provider device 104, to the transmitting device, e.g. consumer device 102. As discussed above, this information may include a description of the appearance of the AR object, or may be a reference to a common library of AR objects. The placement information may include references to anchor points previously supplied by the transmitting device, or otherwise commonly shared by the transmitting and receiving devices (such as where both the transmitting and receiving device derive their own substantially identical point clouds and/or anchor points), to allow the transmitting device to accurately recreate the position of the AR object within each video frame. Further, the information about the AR object and its placement may be correlated to frames of the video stream, such as by using a key, as discussed above. Such correlating to frames may be useful where a user of the receiving device is dynamically moving one or more AR objects around the video, allowing such movements to be recreated on the display associated with the transmitting device by indicating positional changes of the one or more AR objects in each frame relative to the one or more referenced anchor points.

It will be appreciated by a person skilled in the relevant art that transmitting the video stream, and receiving AR object information, across a network will introduce a lag or delay, in most embodiments. Thus, a frame captured by consumer device 102 may be displayed upon a display associated with consumer device 102 prior to it being received by service provider device 104, and let alone prior to consumer device 102 receiving any AR object information. Consequently, in various embodiments, consumer device 102 may handle this lag by buffering video frames prior to display until AR information is received back from the service provider device, at which point the AR objects can be rendered and displayed to a user of the consumer device 102. Such embodiments may result in a slight delay or lag between capture of video and display of video; this lag, however, may be relatively minimal and acceptable to a user of consumer device 102, particularly where consumer device 102 and service provider device 104 are connected via a high-speed network connection. In embodiments where such a lag may be unacceptably high, consumer device 102 may display the frames as received from the video camera, and then render the AR objects in later frames from the frames where the AR objects were initially placed on the service provider device 104. Where, in embodiments, the AR object placement information is made relative to identified anchor points, rendering the object(s) in subsequent frames, even where the camera 106 has moved position, is a matter of locating the new position of the anchor point(s) in the subsequent frames and rendering the AR object(s) relative to the new position of the anchor point(s); synchronizing to specific keyed frames may be unnecessary.

Figure 5:
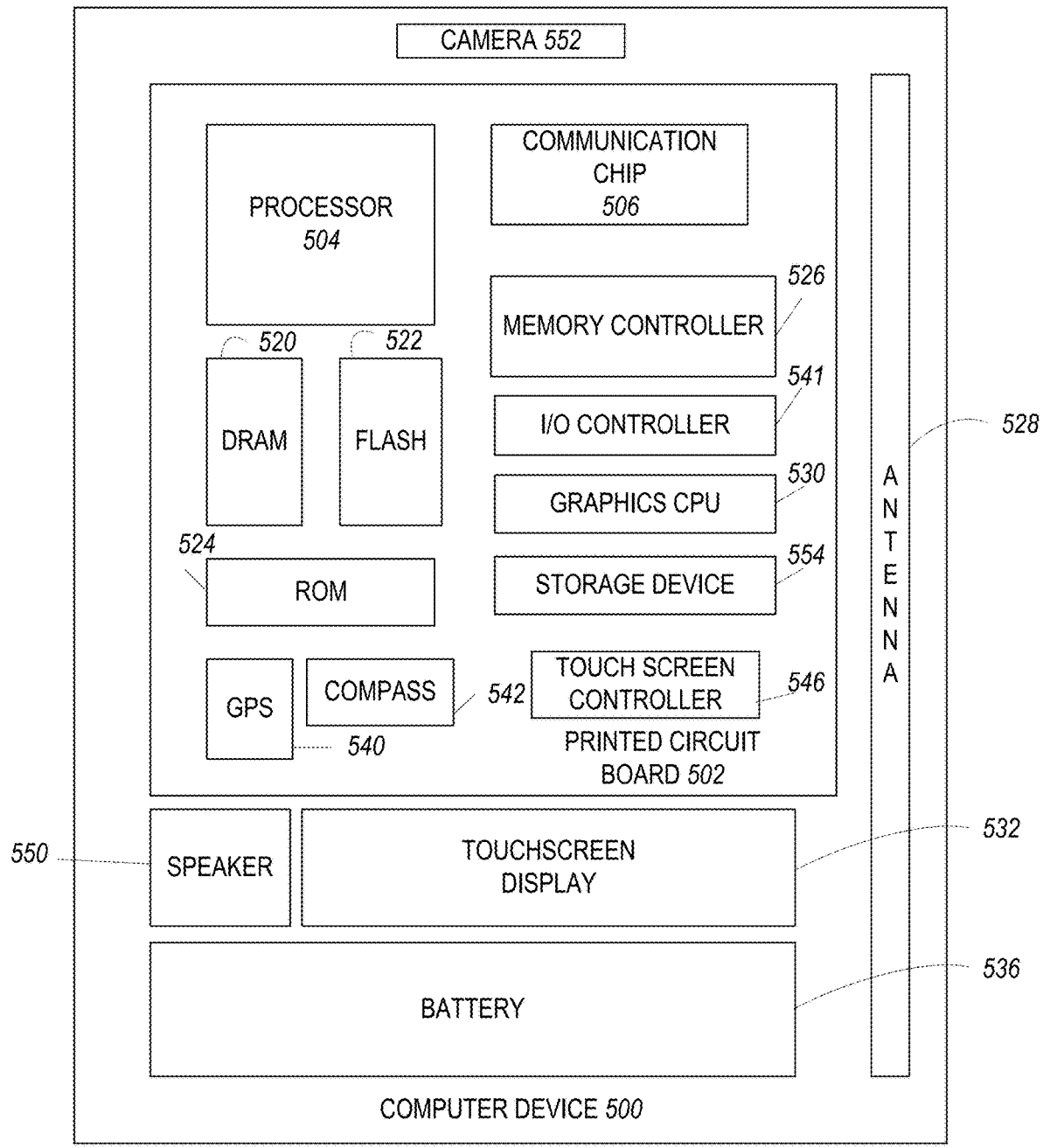
FIG. 5 is a block diagram of an example computer that can be used to implement some or all of the components of the system of FIG. 1.

FIG. 5 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), a depth sensor (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and methods 200, 400 and 450, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, 400 and/or method 450. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for synchronizing augmented reality (AR) objects across a network, comprising:
    capturing, by a user device, a video stream and associated spatial position information of the user device;
    initiating, by the user device, a communications session with a remote device;
    transmitting, by the user device, the video stream and associated spatial position information across a network to the remote device for viewing on a screen by a user of the remote device; and
    receiving, at the user device over the network while the communications session is in progress, AR information corresponding to the placement of one or more AR objects in the video stream, the one or more AR objects having been inserted at the remote device by the user of the remote device.

2. The method of claim 1, wherein receiving AR information comprises receiving information about the shape and orientation of each of the one or more AR objects.

3. The method of claim 1, further comprising extracting one or more anchor points from the video stream and associated spatial position information, and wherein transmitting the associated spatial position information comprises transmitting the one or more anchor points.

4. The method of claim 3, wherein receiving AR information corresponding to the placement of one or more AR objects comprises receiving information placing each of the one or more AR objects relative to one or more of the one or more anchor points.

5. The method of claim 1, further comprising rendering, with the AR information, the one or more AR objects.

6. The method of claim 5, further comprising displaying, on a display in communication with the user device, the one or more rendered AR objects in the video stream.

7. The method of claim 1, further comprising:
    assigning, to each frame of the video stream, a unique key; and
    assigning the unique key to the spatial position information associated with each frame.

8. The method of claim 7, further comprising transmitting, by the user device, the video stream and associated spatial information with the unique key.

9. The method of claim 1, wherein transmitting the video stream and associated spatial position information across a network comprises transmitting to a central server.

10. The method of claim 1, wherein receiving the AR information comprises receiving the AR information from a central server.

11. A method for synchronizing augmented reality (AR) objects across a network, comprising:
    initiating, over a network, a communications session between a first device and a second device;
    receiving, at the first device, a video stream and associated spatial information captured by the second device;
    displaying, for a user of the first device, the video stream;
    placing, by the user of the first device, one or more AR objects within the video stream; and
    transmitting, by the first device, the one or more AR objects and a position of each of the one or more AR objects with respect to the spatial information.

12. The method of claim 11, wherein receiving the associated spatial information comprises receiving one or more anchor points identified in the video stream.

13. The method of claim 12, wherein placing one or more AR objects within the video stream comprises placing one or more AR objects with respect to one or more of the one or more anchor points.

14. The method of claim 13, wherein transmitting the position of each of the one or more AR objects comprises transmitting the position of each of the one or more AR objects with respect to the one or more anchor points.

15. The method of claim 11, further comprising correlating, by the first device, the video stream with the associated spatial information.

16. The method of claim 15, wherein correlating the video stream with the associated spatial information comprises matching a unique key associated with each frame of the video stream with associated spatial information that is tagged with the same unique key.

17. A non-transitory computer readable medium (CRM) comprising instructions, executable by an apparatus, that when executed cause the apparatus to:
    capture a video stream and associated spatial position information of the user device;
    tag each frame of the video stream with a unique key by embedding the unique key into each frame's pixel data;
    tag the spatial position information associated with each frame with the unique key tagged to each respective frame;
    transmit the video stream and associated spatial position information across a network to a service provider device; and receive AR information corresponding to the placement of one or more AR objects in the video stream from the service provider device.

18. The CRM of claim 17, wherein the instructions are to further cause the apparatus to tag each frame of the video stream with the unique key by embedding the key at the edge of each frame.

19. The CRM of claim 17, wherein the instructions are to further cause the apparatus to:
   identify one or more anchor points in the video stream;
   transmit the one or more anchor points as part of the associated spatial position information; and
   correlate the AR information with the video stream with the one or more anchor points in the video stream.

20. The CRM of claim 17, wherein the instructions are to further cause the apparatus to render the one or more AR objects into the video stream, and display the video stream with the one or more AR objects on a display in communication with the apparatus.

* * * * *